United States Patent
Gillis et al.

(10) Patent No.: US 9,199,579 B2
(45) Date of Patent: Dec. 1, 2015

(54) SLIDING DOOR FOR A STORAGE BIN IN A VEHICLE CENTER FLOOR CONSOLE

(71) Applicant: FORD GLOBAL TECHNOLOGIES, LLC, Dearborn, MI (US)

(72) Inventors: Francis Raymond Gillis, Farmington Hills, MI (US); Steven Mousigian, Allen Park, MI (US); Martin Drumb, St. Clair Shores, MI (US); Stephen Jacobsen, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/151,002

(22) Filed: Jan. 9, 2014

(65) Prior Publication Data

US 2015/0191125 A1    Jul. 9, 2015

(51) Int. Cl.
*B60R 11/06* (2006.01)
*B60R 7/04* (2006.01)

(52) U.S. Cl.
CPC .......................................... *B60R 7/04* (2013.01)

(58) Field of Classification Search
CPC .. B60R 7/01; B60R 11/00; B60R 2011/0075; F16C 2370/12; G11B 19/2009; F25D 23/021; B60N 3/101

USPC .......................... 296/37.8, 24.34, 37.1, 37.12
See application file for complete search history.

(56) References Cited

U.S. PATENT DOCUMENTS

| | | | | |
|---|---|---|---|---|
| 6,003,927 A * | 12/1999 | Korber et al. | ................ | 296/37.8 |
| 6,203,088 B1 * | 3/2001 | Fernandez et al. | ........... | 296/37.8 |
| 6,419,314 B1 * | 7/2002 | Scheerhorn | .............. | 297/188.19 |
| 6,478,204 B2 * | 11/2002 | Lange et al. | .................. | 224/539 |
| 6,499,785 B2 * | 12/2002 | Eguchi | ......................... | 296/37.8 |
| 6,547,299 B2 * | 4/2003 | Atanasiu et al. | ........... | 296/24.34 |
| 6,616,206 B2 * | 9/2003 | Luginbill et al. | ............. | 296/37.8 |
| 6,672,554 B2 * | 1/2004 | Fukuo | ........................ | 248/311.2 |
| 6,702,352 B2 * | 3/2004 | Nakanishi et al. | ......... | 296/24.34 |
| 6,749,079 B2 * | 6/2004 | Katagiri et al. | ............. | 220/345.2 |
| 7,029,049 B2 * | 4/2006 | Rockafellow et al. | ....... | 296/37.8 |
| 7,168,750 B2 | 1/2007 | Hutek et al. | | |
| 7,731,254 B2 | 6/2010 | Lota | | |
| 8,196,985 B2 | 6/2012 | Penner et al. | | |
| 8,376,436 B2 | 2/2013 | Nakamura et al. | | |
| 8,641,120 B2 * | 2/2014 | Zimmerman et al. | ..... | 296/24.34 |
| 2010/0066115 A1 | 3/2010 | Hipshier et al. | | |

* cited by examiner

*Primary Examiner* — Kiran B Patel
(74) *Attorney, Agent, or Firm* — Vichit Chea (57) ABSTRACT

A motor vehicle console includes a housing having a pair of side panels that define a storage bin having an opening and an upper panel that extends between the pair of side panels adjacent to the storage bin opening. A rigid door is supported on the housing for movement between a closed position that prevents access to the bin and an opened position that permits access to the bin. The rigid door is flush with the panel when in the closed position.

20 Claims, 9 Drawing Sheets

SLIDING DOOR FOR A STORAGE BIN IN A VEHICLE CENTER FLOOR CONSOLE

BACKGROUND OF THE INVENTION

This invention relates in general to storage bins that are provided in the center floor consoles of motor vehicles. In particular, this invention relates to an improved structure for a rigid sliding door that extends flush with the mating components of the center floor console when the door is in a closed position.

Motor vehicle center floor consoles are well known in the art and frequently include a storage bin for the convenient storage of objects therein. In many of such center floor consoles, a door or other covering structure is provided for selectively covering an opening defined by the storage bin to retain objects therein and for aesthetic purposes. In those consoles, the door of the storage bin is movable between a closed position, wherein access to the storage bin is not permitted, and an opened position, wherein access to the storage bin is permitted.

In some instances, the door of the storage bin is formed from a rigid member that is slidable between the closed and opened positions. In those instances, the rigid door is typically slidable in a straight line of movement between the opened and closed positions. As a result, a non-flush interface is presented at a junction between an edge of the door and a mating panel provided on the center floor console. Although this structure has been effective, it would be desirable to provide an improved structure for a rigid sliding door that extends flush with the mating component of the center floor console when the door is in a closed position.

SUMMARY OF THE INVENTION

This invention relates to an improved structure for a rigid sliding door for a storage bin provided in a center floor console of a motor vehicle that extends flush with a mating component of the center floor console when the door is in a closed position. The motor vehicle console includes a housing having a pair of side panels that define a storage bin having an opening and an upper panel that extends between the pair of side panels adjacent to the storage bin opening. A rigid door is supported on the housing for movement between a closed position that prevents access to the bin and an opened position that permits access to the bin. The rigid door is flush with the panel when in the closed position. The rigid door is supported on a track that, in turn, is supported on the housing. The track includes a first end having a first pair of grooves provided therein and a second end having a second pair of grooves provided therein. The door has a first pair of protrusions that extend respectively into the first pair of grooves and a second pair of protrusions that extend respectively into the second pair of grooves. Each of the first pair of grooves extends in a generally linear manner, and each of the second pair of grooves initially extends in a generally curved manner, then subsequently in a generally linear manner.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
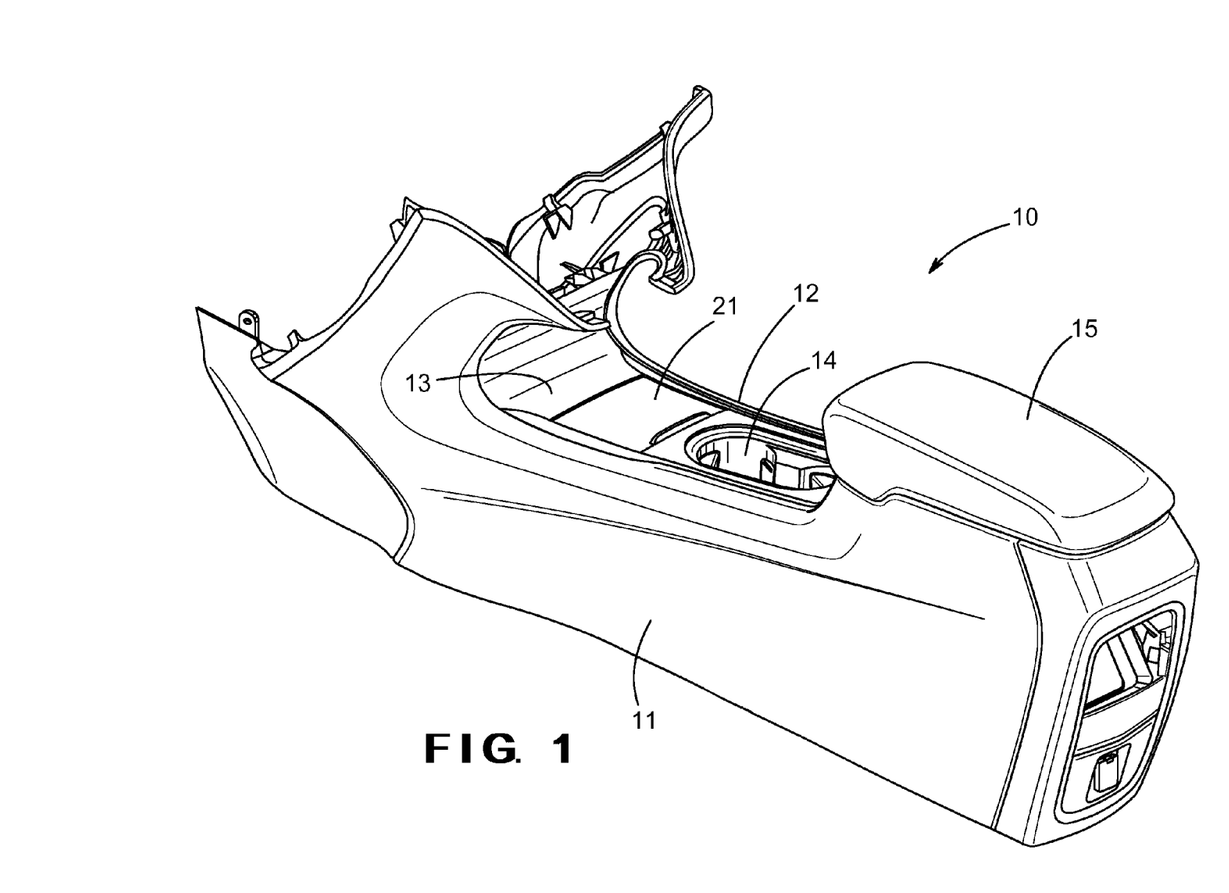
FIG. 1 is a perspective view of a motor vehicle center floor console that includes a sliding door assembly in accordance with this invention.

Referring now to the drawings, there is illustrated in FIG. 1 a center floor console, indicated generally at 10, of a motor vehicle (not shown) in accordance with this invention. Motor vehicle center floor consoles of this general type are well known in the art and frequently include a storage bin (not shown in FIG. 1) for the convenient storage of objects therein. Although this invention will be described and illustrated in the context of the specifically illustrated center floor console 10, it will be appreciated that this invention may be practiced with other types of consoles having different shapes and structures.

The illustrated center floor console 10 includes a housing that is defined by a pair of side panels 11 and 12 and an upper panel 13 that generally extends between the pair of side panels 11 and 12. The illustrated center floor console 10 also includes a cup holder 14 and an arm rest 15, both of which are conventional in the art and form no part of this invention. Lastly, the illustrated center floor console 10 is shaped having an interior space that defines a conventional storage bin 16. The storage bin 16 is provided for the convenient storage of objects therein and has an opening defined about an upper end thereof.

A sliding door assembly, indicated generally at 20, is provided for selectively covering the opening defined by the storage bin 16 to retain objects therein and for aesthetic purposes. As will be explained in detail below, the sliding door assembly 20 includes a rigid door 21 that is slidable between a closed position (illustrated in FIG. 2), wherein access to the storage bin 16 is not permitted, and an opened position (illustrated in FIG. 3), wherein access to the storage bin 16 is permitted.

Figure 2:
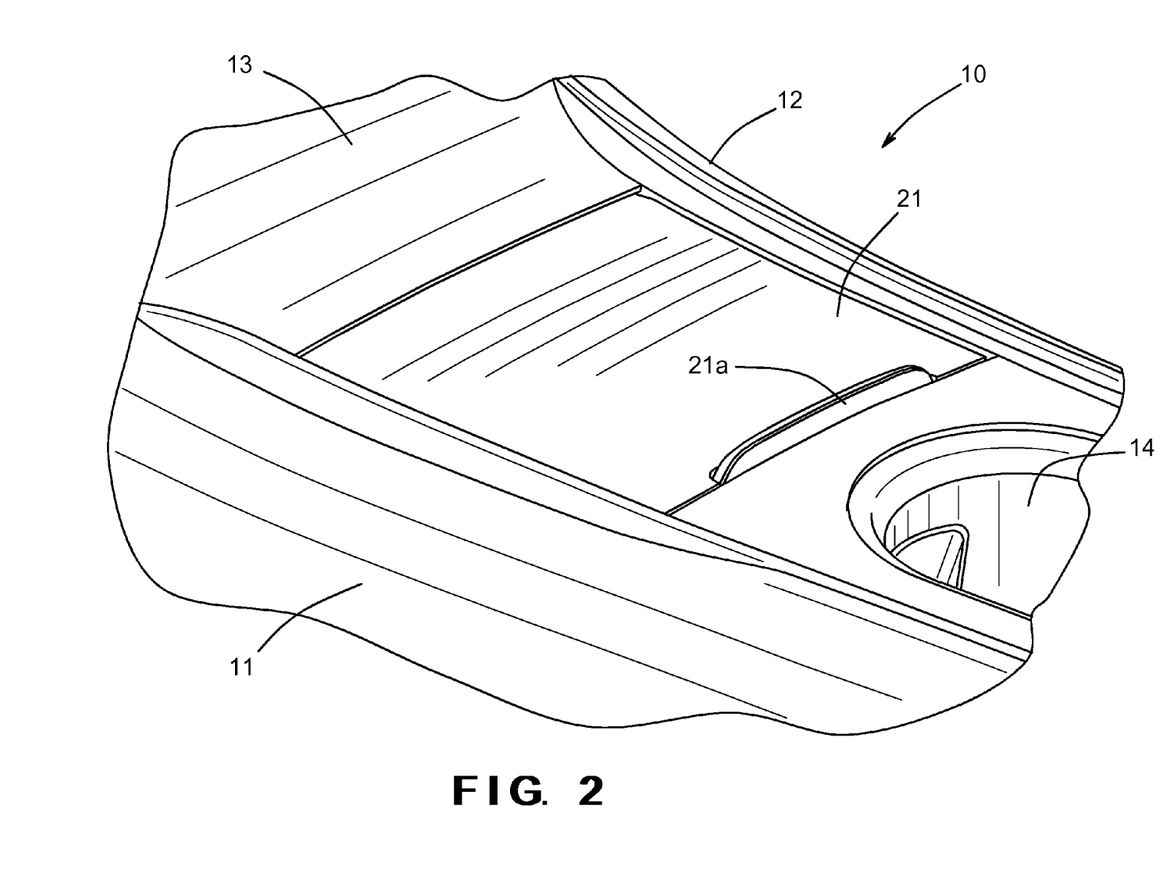
FIG. 2 is an enlarged perspective view of a portion of the center floor console illustrated in FIG. 1 showing a rigid sliding door of the sliding door assembly in a closed position.
Figure 3:
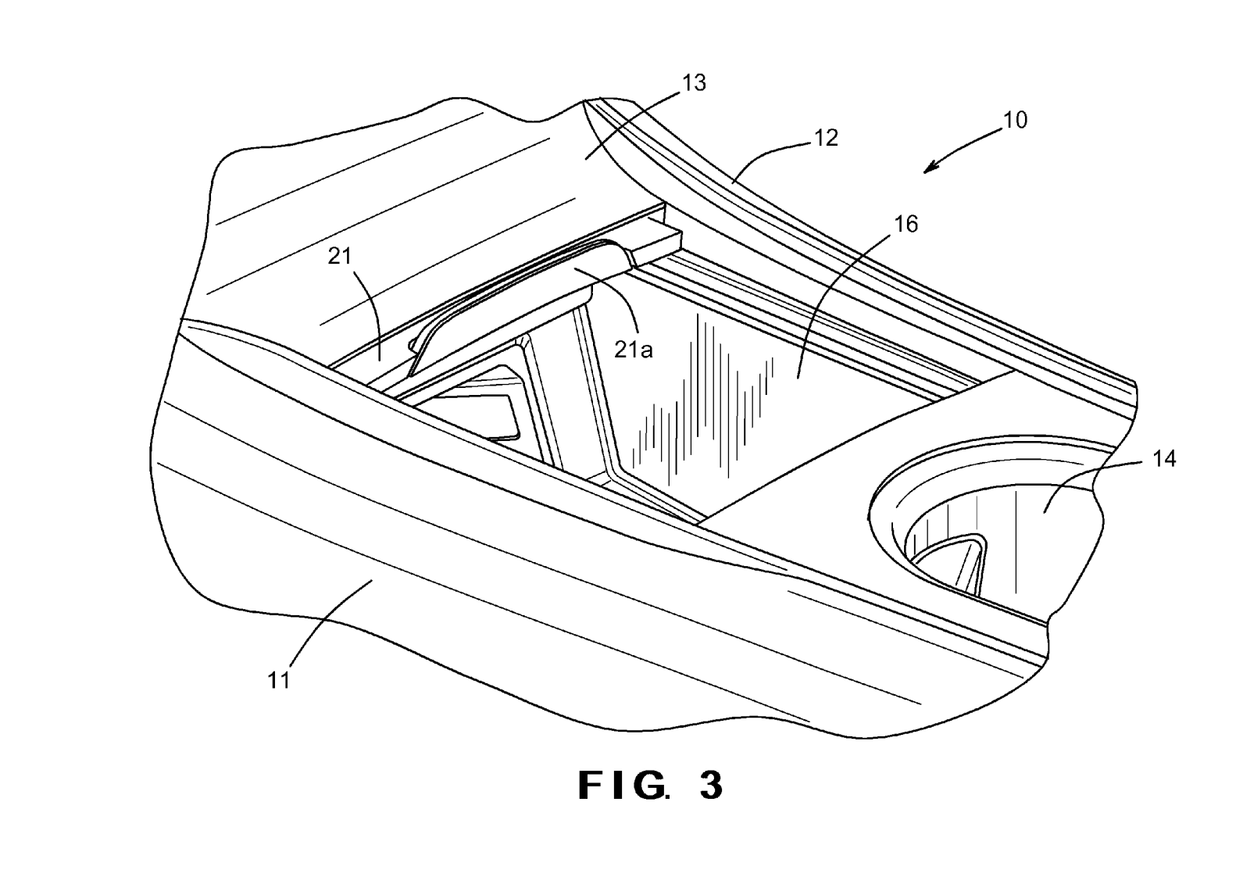
FIG. 3 is an enlarged perspective view similar to FIG. 2 showing the rigid sliding door of the sliding door assembly in an opened position.
Figure 4:
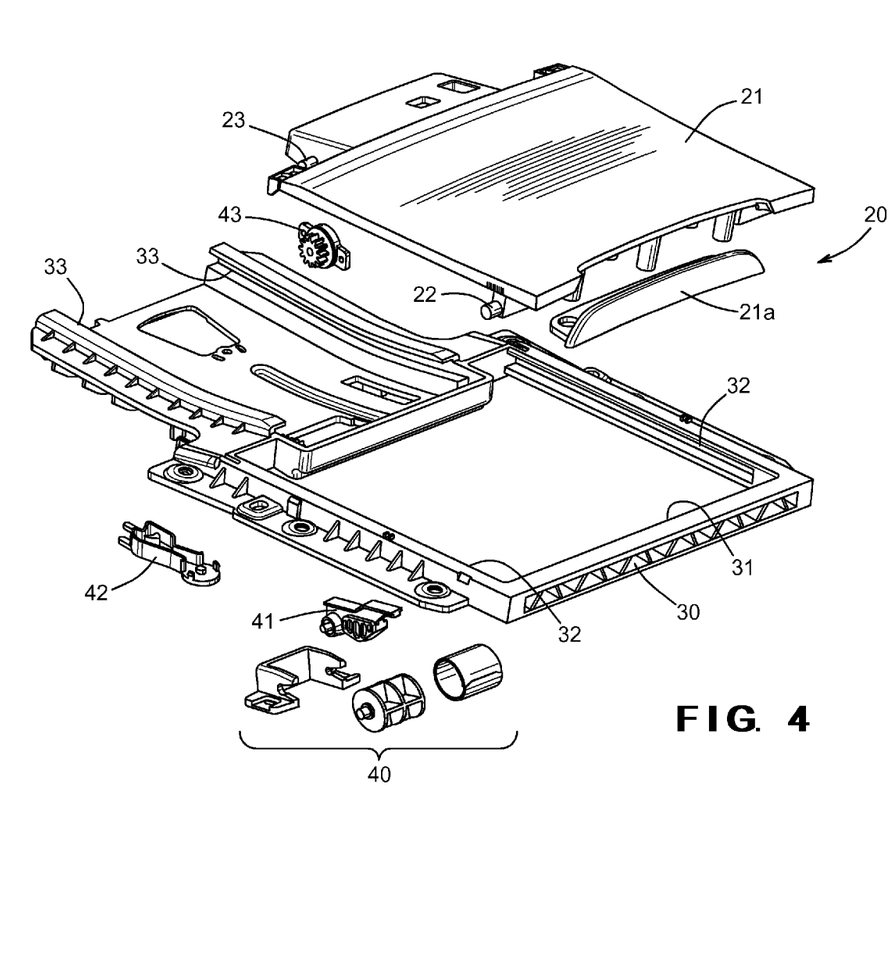
FIG. 4 is an exploded perspective view of the sliding door assembly illustrated in FIGS. 1 through 3.
Figure 5:
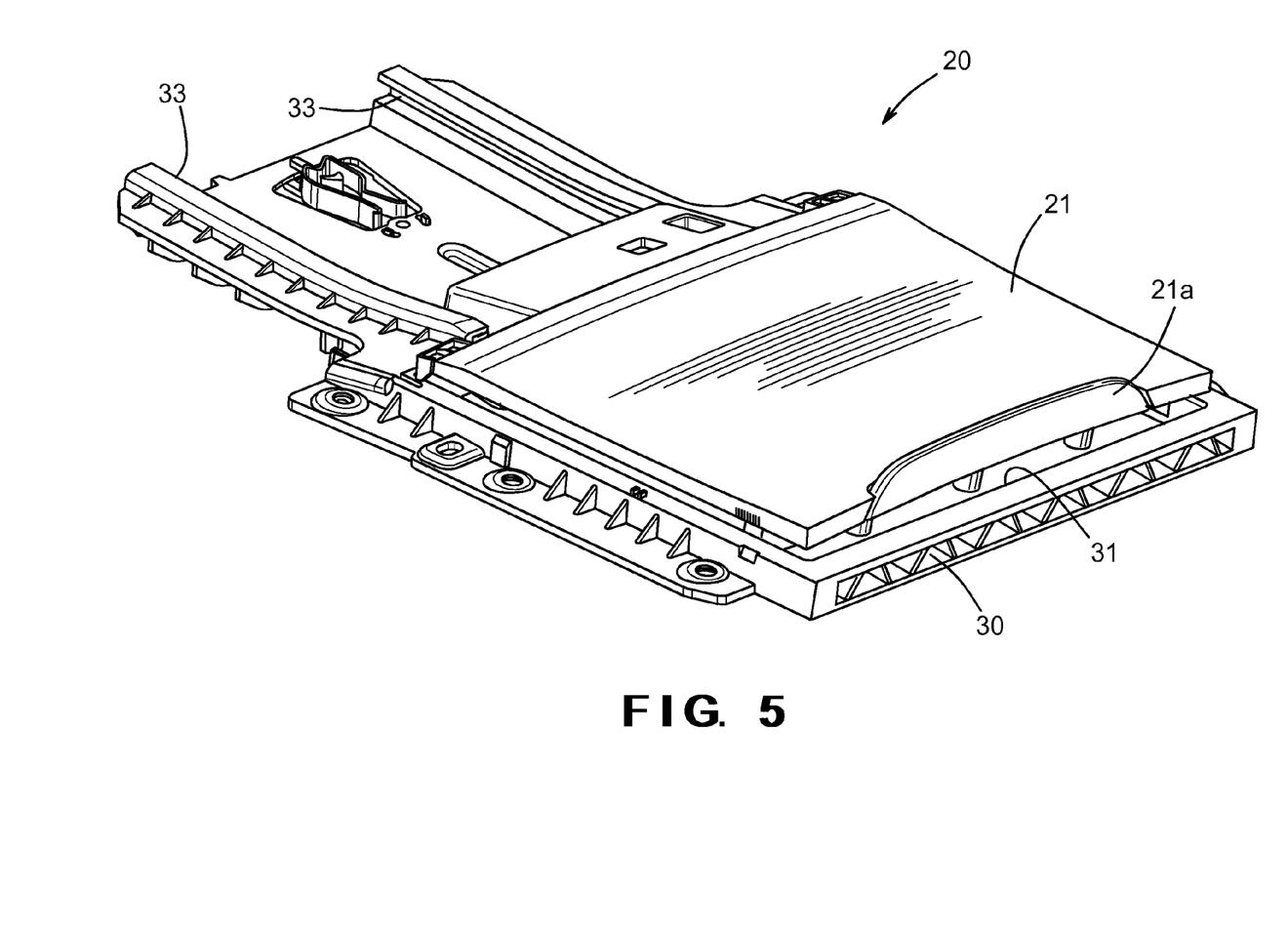
FIG. 5 is an enlarged perspective view of portions of the sliding door assembly showing the rigid sliding door in the closed position.
Figure 6:
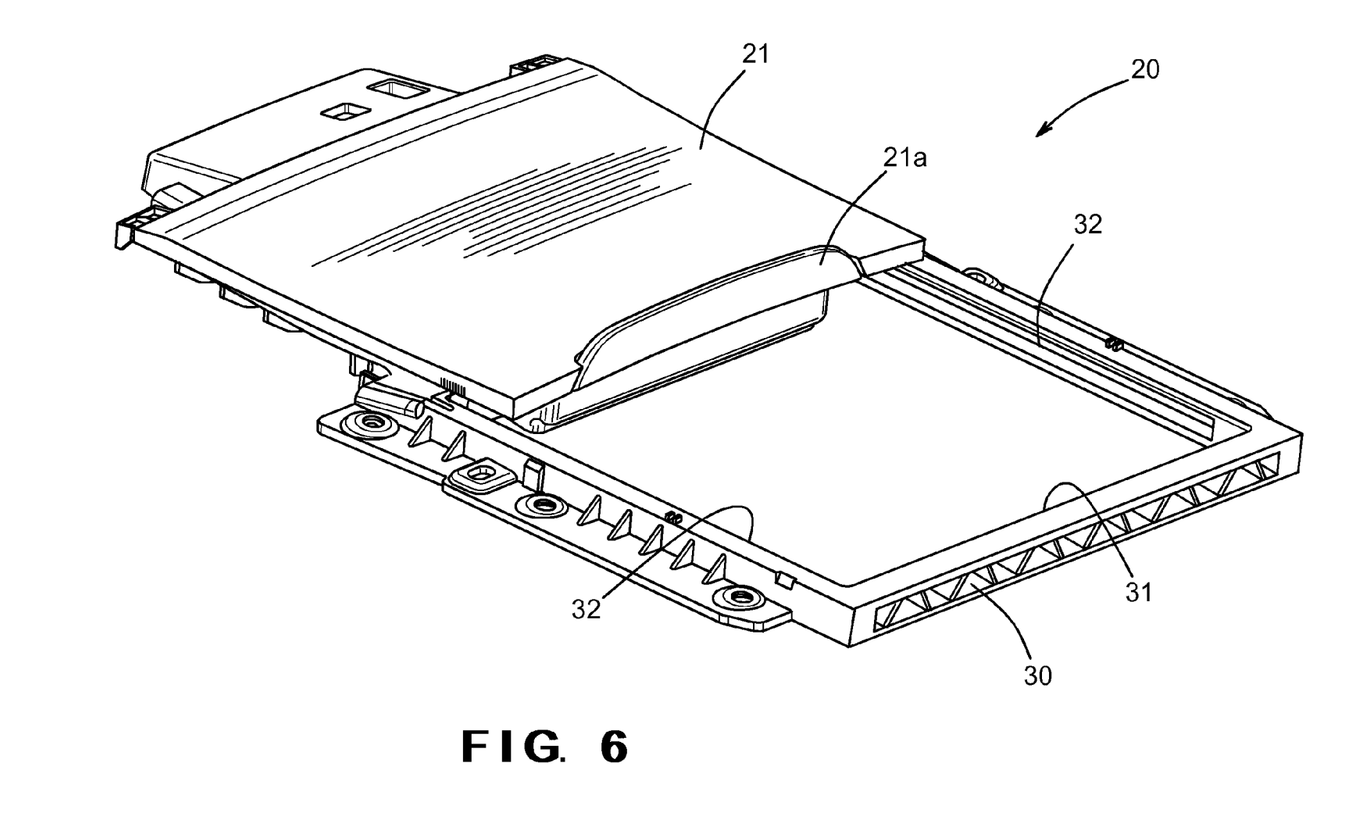
FIG. 6 is an enlarged perspective view similar to FIG. 5 showing the rigid sliding door in the opened position.

FIG. 4 is an exploded perspective view of the sliding door assembly 20 illustrated in FIGS. 1 through 3. As shown therein, the door 21 of the sliding door assembly 20 is shown as being generally flat and rectangular in shape. However, the door 21 may be formed having any desired shape or size. A conventional accent piece 21a may be supported on (or formed integrally with) the door 21 to facilitate grasping of the door 21 by a user and sliding movement between the closed and opened positions in the manner described below. The door 21 has a first pair of laterally extending protrusions 22 provided near a first end thereof. The door 21 also has a second pair of laterally extending protrusions 23 provided near a second end thereof. The first and second pairs of protrusions 22 and 23 are more clearly illustrated in FIG. 7. The purpose for the first and second pairs of protrusions 22 and 23 will be explained below.

Figure 7:
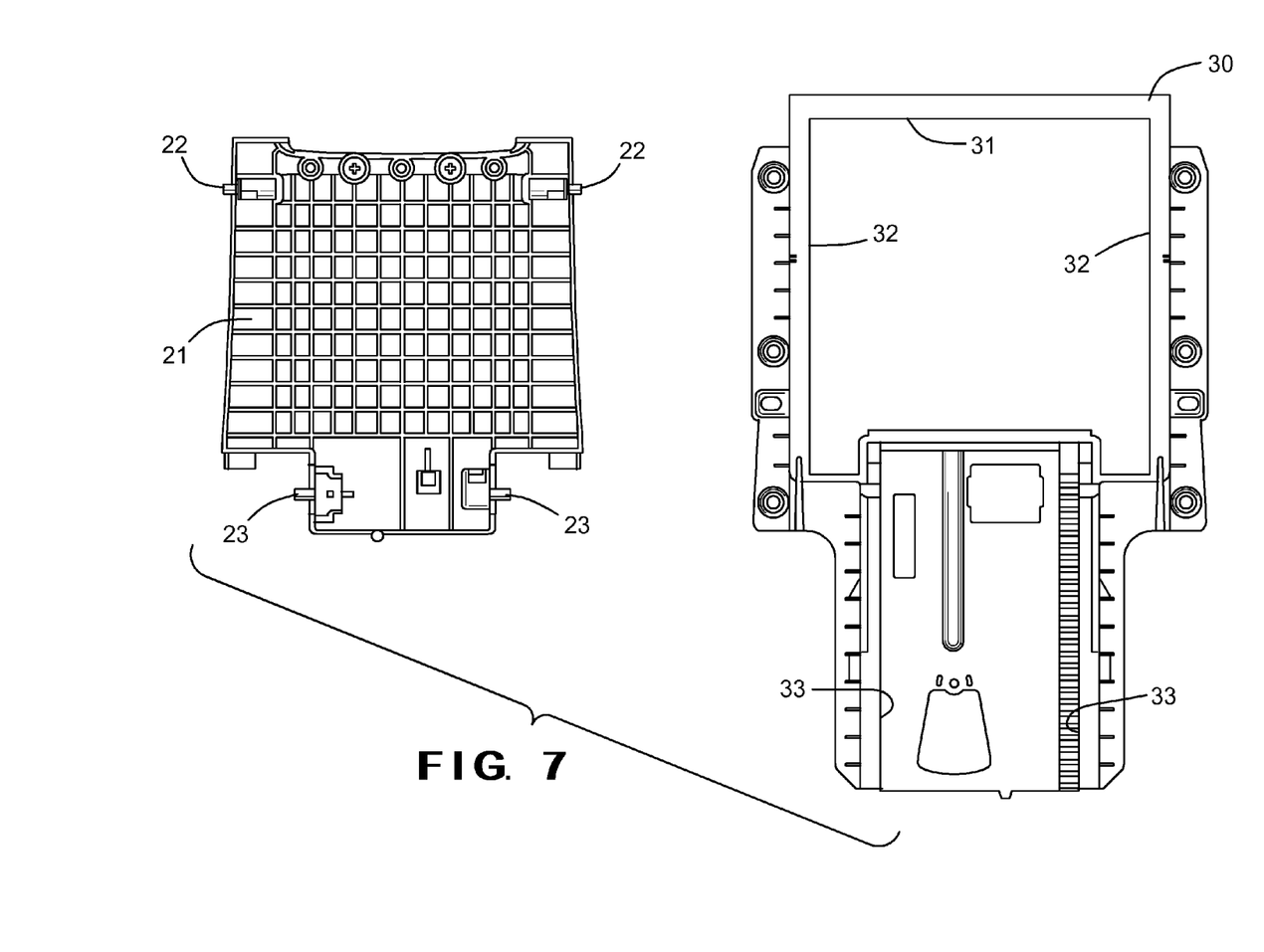
FIG. 7 is a bottom plan view of portions of the sliding door assembly illustrated in FIGS. 3 through 6.
Figure 8:
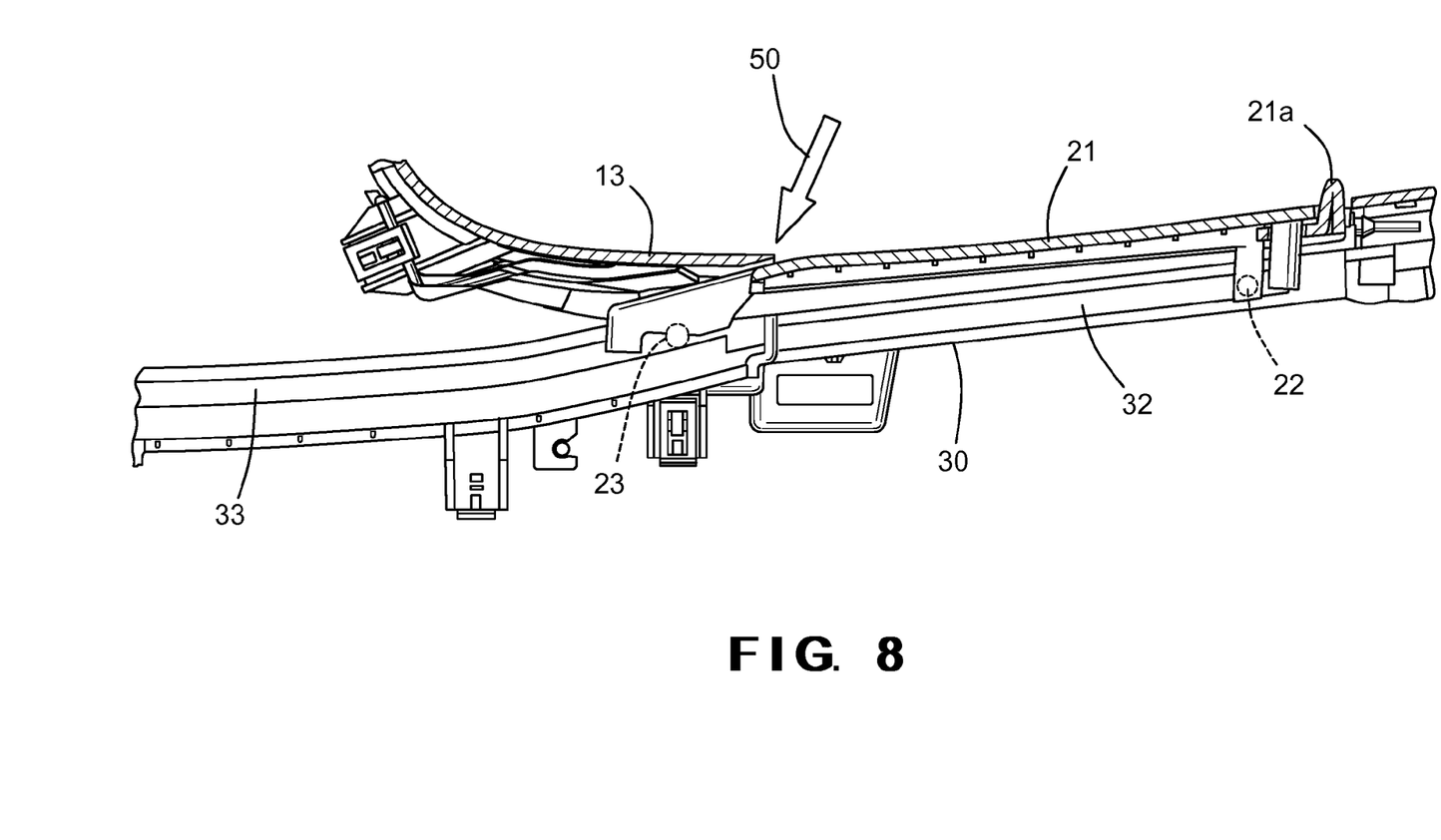
FIG. 8 is an enlarged side sectional view of portions of the sliding door assembly illustrated in FIGS. 3 through 7.

The sliding door assembly 20 also includes a track 30 that supports the door 21 and, in turn, is supported on the center floor console 10. The structure of the track 30 is best illustrated in FIGS. 4, 7, and 8. As shown therein, the track 30 includes a first end having an opening 31 formed therethrough. The opening 31 is preferably sized and shaped in correspondence with the size and shape of the upper opening of the storage bin 16. Thus, when the track 30 is supported on the center floor console 10 as shown in FIGS. 1, 2, and 3, the opening 31 defined by the track 30 is generally coextensive with the upper opening of the storage bin 16, although such is not required. A first pair of opposed grooves 32 is provided in the first end of the track 30 for a purpose that will be explained below. In the illustrated embodiment, the first pair of grooves 32 is formed in lateral sides of the track 30 that define the opening 31, although such is not required. The track 30 also includes a second end that extends longitudinally from the first end. A second pair of opposed grooves 33 is similarly provided in the second end of the track 30, again for a purpose that will be explained below.

As shown in FIG. 4, the sliding door assembly 20 may further include a variety of other components that facilitate the movement of the door 21 relative to the storage bin 16. For example, the sliding door assembly 20 may include a spring assembly 40, an inertial lockout component 41, a push-pull latch 42, and a viscous damper 43. The spring assembly 40 reacts between the track 30 and the door 21 such that when the door 21 is moved by an operator from the closed position to the opened position, energy is stored in the spring assembly 40. As the door 21 is moved into the opened position, the push-pull latch 42 is actuated to retain the door 21 in that opened position. Thereafter, when it is desired to move the door 21 from the opened position to the closed position, the push-pull latch 42 is actuated to release the door 21 and allow the energy stored in the spring assembly 40 to automatically slide the door 21 from the opened position back to the closed position. The inertial lockout component 41 and the viscous damper 43 are provided to prevent the door 21 from being moved too quickly during its return from the opened position to the closed position. All of these components are conventional in the art and form no part of this invention.

Figure 9:
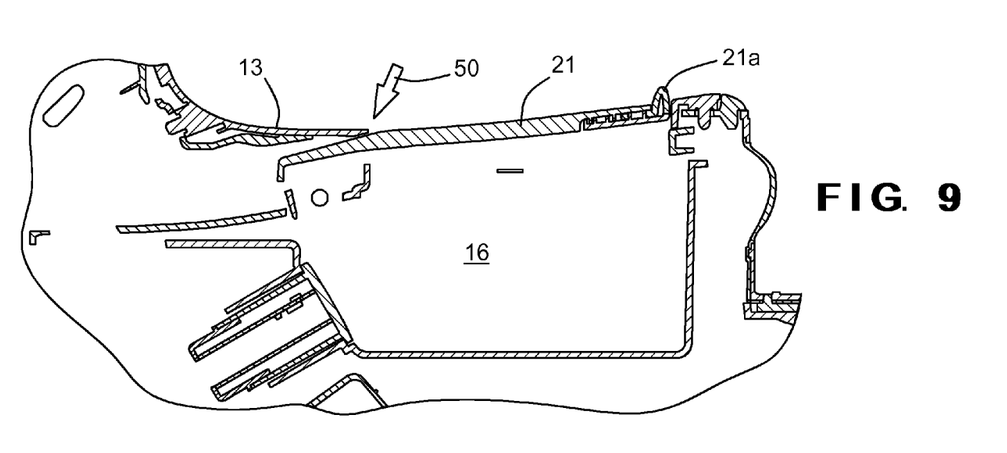
FIG. 9 is a schematic side view of portions of the center floor console showing the rigid sliding door in the closed position.
Figure 10:
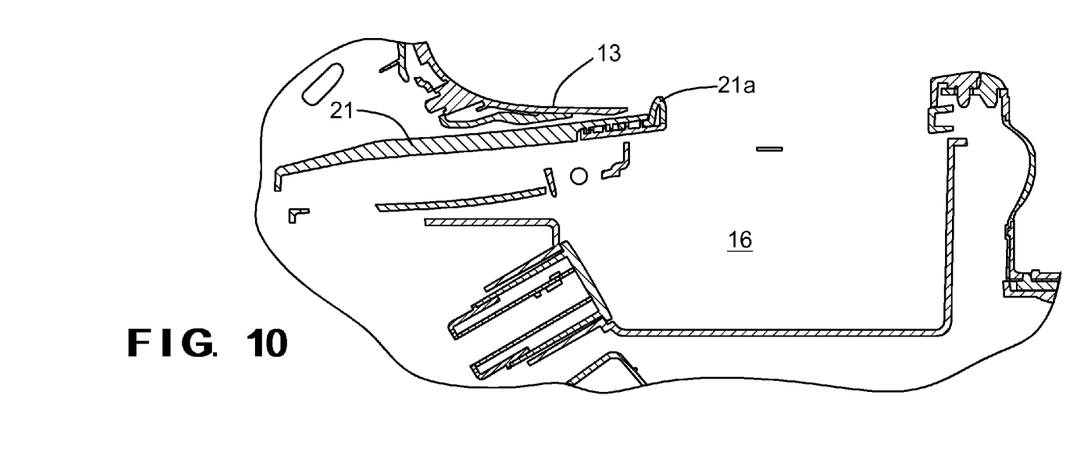
FIG. 10 is a schematic side view similar to FIG. 9 showing the rigid sliding door in the opened position.

FIGS. 8, 9, and 10 illustrate how the door 21 cooperates with the track 30 in accordance with this invention. FIG. 8 shows one of the first pair of protrusions 22 provided on the door 21 extending laterally into cooperation with an associated one of the first pair of opposed grooves 32 is provided in the first end of the track 30. Although not illustrated, it is evident that the other one of the first pair of protrusions 22 provided on the door 21 extends laterally into cooperation with the associated other one of the first pair of opposed grooves 32 provided in the first end of the track 30. Thus, a first end of the door 21 (i.e., the end that is adjacent to the first pair of protrusions 22—referred to as the rearward end of the door 21) is supported on the first end of the track 30 for sliding movement.

Similarly, FIG. 8 also shows one of the second pair of protrusions 23 provided on the door 21 extending laterally into cooperation with an associated one of the second pair of opposed grooves 33 provided in the second end of the track 30. Although not illustrated, it is evident that the other one of the second pair of protrusions 23 provided on the door 21 extends laterally into cooperation with the associated other one of the second pair of opposed grooves 33 provided in the second end of the track 30. Thus, a second end of the door 21 (i.e., the end that is adjacent to the second pair of protrusions 23—referred to herein as the forward end of the door 21) is supported on the second portion of the track 30 for sliding movement.

FIG. 8 best illustrates the geometries of the first pair of opposed grooves 32 and the second pair of opposed grooves 33 that are provided in the track 30. As shown therein, the first pair of opposed grooves 32 extends in a generally linear manner from the rear end (the right side of FIG. 8) toward the front end (the left side of FIG. 8) of the sliding door assembly 20. The second pair of opposed grooves 33 initially extends in a generally curved manner, then subsequently in a generally linear manner from the rear end (the right side of FIG. 8) toward the front end (the left side of FIG. 8) of the sliding door assembly 20.

In FIGS. 8 and 9, the door 21 is shown in the closed position, wherein access to the storage bin 16 is not permitted. In this closed position, the forward end of the door 21 is supported on the track 30 such that the front end thereof is flush with the rear end of the upper panel 13 of the center floor console 10, as indicated by the arrow 50 in FIGS. 8 and 9. This flush alignment of the forward end of the door 21 with the rearward end of the upper panel 13 of the center floor console 10 can be achieved by appropriately sizing and shaping of the second pair of protrusions 23 on the door 21 and the second pair of opposed grooves 33 provided in the second end of the track 30. Such flush alignment is important for aesthetic and other reasons.

When the door 21 is moved from the closed position (illustrated in FIGS. 8 and 9) to the opened position (illustrated in FIG. 10), the first pair of protrusions 22 travels through the first pair of opposed grooves 32 from the rear end toward the front end of the sliding door assembly 20. Similarly, the second pair of protrusions 23 also travels through the second pair of opposed grooves 33 from the rear end toward the front end of the sliding door assembly 20. Because of the initial curved shape of the second pair of opposed grooves 33, the forward end of the door 21 initially drops down below the rearward end of the upper panel 13 of the center floor console 10. As a result, the door 21 is causes to pivot about the first pair of protrusions 22 (counterclockwise when viewing FIG. 8). This pivoting movement of the door 21 insures that the forward end thereof clears the rearward end of the upper panel 13 of the center floor console 10 as it moved forwardly beneath the upper panel 13. Such forward movement of the door continues until the accent piece 21a is moved adjacent to the rearward end of the upper panel 13 of the center floor console 10 (as shown in FIG. 10), and the push-pull latch 42 is actuated to retain the door 21 in that opened position. When the push-pull latch 42 is subsequently actuated to release the door 21, the door 21 is moved rearwardly until it resumes the original closed position illustrated in FIGS. 8 and 9.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A motor vehicle console comprising:
   a housing including a panel having an end and a bin having an opening adjacent to the end of the panel; and
   a rigid door that is a single rigid member supported on the housing for sliding movement between a closed position that prevents access to the bin and an opened position that permits access to the bin, wherein the rigid door has an end that is flush with the end of the panel when the rigid door is in the closed position and that is spaced apart from and is not flush with the end of the panel when the rigid door is in the opened position.

2. The motor vehicle console defined in claim 1 wherein the housing includes a pair of side panels defining the storage bin, and wherein the panel is an upper panel that extends between the pair of side panels adjacent to the opening.

3. The motor vehicle console defined in claim 1 wherein the rigid door is supported on a track, and wherein the track is supported on the housing.

4. The motor vehicle console defined in claim 3 wherein the track defines an opening that is generally coextensive with an opening defined by the storage bin.

5. The motor vehicle console defined in claim 3 wherein the track has a pair of grooves provided therein, and wherein the door has a pair of protrusions that extend respectively into the pair of grooves.

6. The motor vehicle console defined in claim 5 wherein each of the pair of grooves extends in a generally linear manner.

7. The motor vehicle console defined in claim 3 wherein the track includes a first end having a first pair of grooves provided therein and a second end having a second pair of grooves provided therein, and wherein the door has a first pair of protrusions that extend respectively into the first pair of grooves and a second pair of protrusions that extend respectively into the second pair of grooves.

8. The motor vehicle console defined in claim 7 wherein each of the first pair of grooves extends in a generally linear manner.

9. The motor vehicle console defined in claim 8 wherein each of the second pair of grooves initially extends in a generally curved manner, then subsequently in a generally linear manner.

10. The motor vehicle console defined in claim 1 wherein the rigid door is aligned flush with a rear end of the panel when in the closed position.

11. The motor vehicle console defined in claim 7 wherein the second pair of grooves is spaced inside of the first pair of grooves.

12. The motor vehicle console defined in claim 7 wherein the first pair of grooves is formed in lateral sides of the track that define the opening and the second pair of grooves extends under the panel.

13. A motor vehicle console comprising:
a housing including a panel and a bin having an opening adjacent to the panel; and
a rigid door supported on the housing for movement between a closed position that prevents access to the bin and an opened position that permits access to the bin, wherein the rigid door is flush with the panel when in the closed position and not flush with the panel when in the opened position, wherein:
the rigid door is supported on a track,
the track is supported on the housing,
the track includes a first end having a first pair of grooves provided therein and a second end having a second pair of grooves provided therein,
the door has a first pair of protrusions that extend respectively into the first pair of grooves and a second pair of protrusions that extend respectively into the second pair of grooves, and either:
the second pair of grooves is spaced inside of the first pair of grooves, or
the first pair of grooves is formed in lateral sides of the track that define the opening and the second pair of grooves extends under the panel.

14. The motor vehicle console defined in claim 13 wherein the housing includes a pair of side panels defining the storage bin, and wherein the panel is an upper panel that extends between the pair of side panels adjacent to the opening.

15. The motor vehicle console defined in claim 13 wherein the track defines an opening that is generally coextensive with an opening defined by the storage bin.

16. The motor vehicle console defined in claim 13 wherein each of the first pair of grooves extends in a generally linear manner.

17. The motor vehicle console defined in claim 16 wherein each of the second pair of grooves initially extends in a generally curved manner, then subsequently in a generally linear manner.

18. The motor vehicle console defined in claim 13 wherein the rigid door is aligned flush with a rear end of the panel when in the closed position.

19. The motor vehicle console defined in claim 13 wherein the second pair of grooves is spaced inside of the first pair of grooves.

20. The motor vehicle console defined in claim 13 wherein the first pair of grooves is formed in lateral sides of the track that define the opening and the second pair of grooves extends under the panel.

* * * * *